Nov. 3, 1953 — L. O. GREELEY — 2,657,935
WHEEL UNIT MOUNTING
Filed May 19, 1947 — 3 Sheets-Sheet 2

INVENTOR
LEO O. GREELEY
BY Liverance and Van Antwerp
ATTORNEYS

Nov. 3, 1953 L. O. GREELEY 2,657,935
WHEEL UNIT MOUNTING
Filed May 19, 1947 3 Sheets-Sheet 3
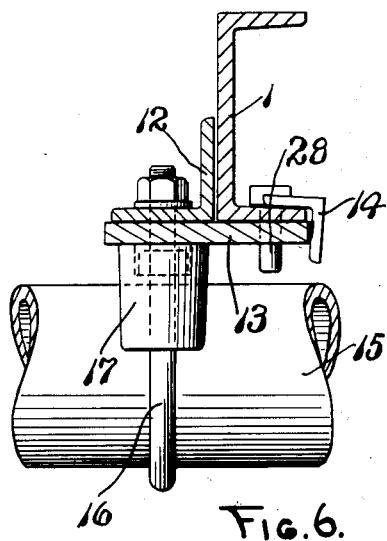
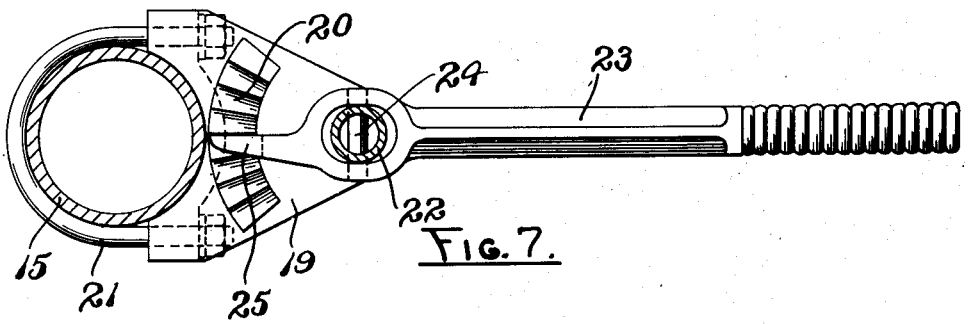
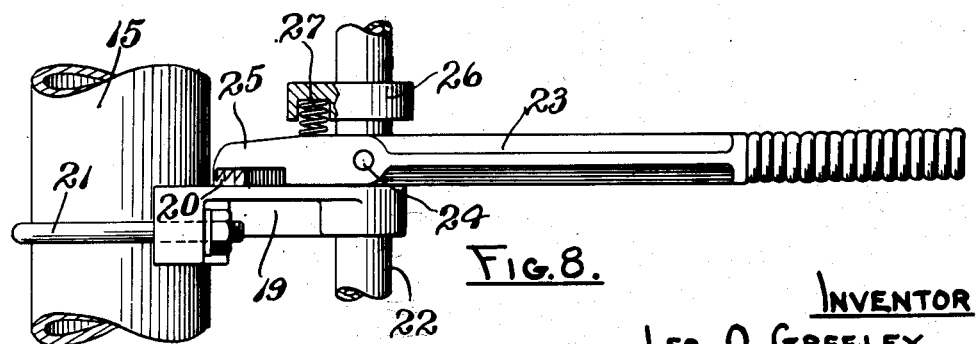
INVENTOR
Leo O. Greeley
By Liverance and
Van Antwerp
Attorneys Patented Nov. 3, 1953

2,657,935

UNITED STATES PATENT OFFICE 2,657,935

WHEEL UNIT MOUNTING

Leo O. Greeley, Cadillac, Mich., assignor to General Sales Company of Cadillac, Cadillac, Mich., a limited partnership of Michigan Application May 19, 1947, Serial No. 749,108

1 Claim. (Cl. 280—33.4)

This invention is directed to a novel wheel mounting for trailers which are drawn and pushed by a tractor, truck or other equivalent machine, on which trailer in practice various types of mechanism may be mounted, the one for illustrative purposes in the disclosure made, being a conveyor means for removing snow and elevating it into the body of the truck which pushes the trailer and the snow conveying and elevating mechanisms.

At the times when the mechanism is being usefully operated, the wheel unit mounting of my invention is located at the front end of the trailer and held in such position, and the snow removing mechanism is pushed by a truck, which moves in a backward direction.

At other times when the snow removing mechanism is not to be operated but is moved to a place where it is to be used, it is drawn by the truck moving in a forward direction. Under such conditions the wheel unit mounting of my invention is located at a rear position on the trailer frame, so that the center of gravity is ahead of the wheels used with a consequent elevation of the rear end of the trailer above the road over which it is drawn.

It is an object and purpose of the present invention to provide a novel structure as stated, which is very practical and serviceable and readily and easily controlled as to the positioning of the wheels which carry the trailer and snow removing mechanism during snow removal, or in drawing the snow removing machine to a place of use or away therefrom.

Figure 1:
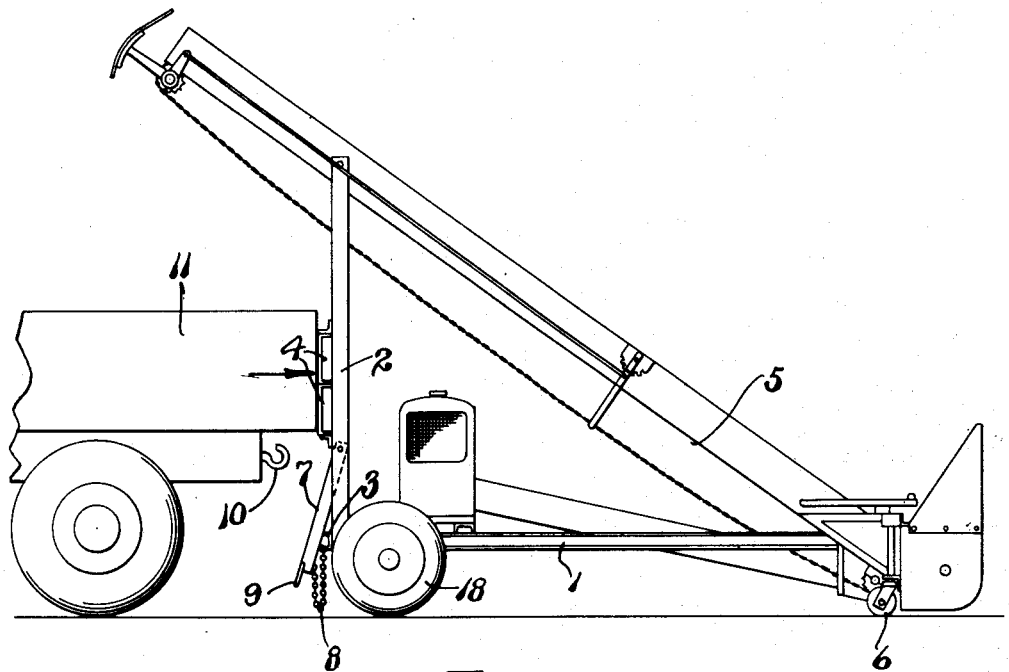
Figure 2:
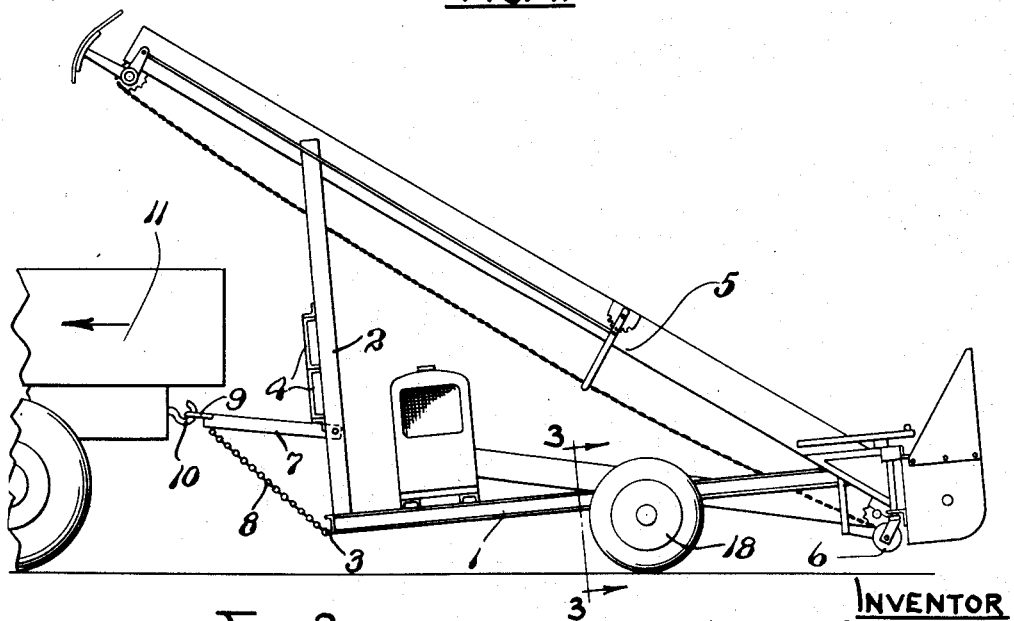
Figure 3:
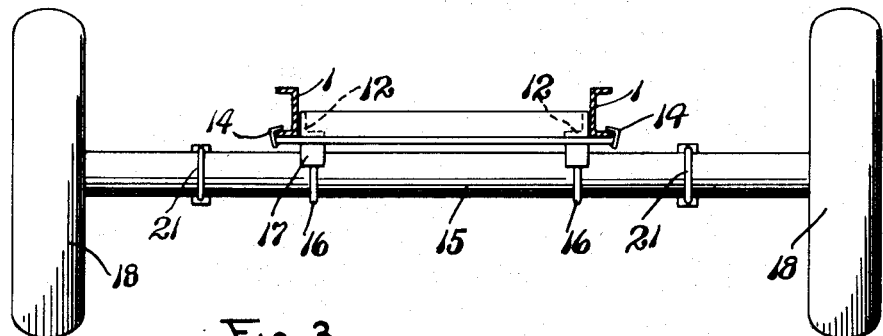
Figure 4:
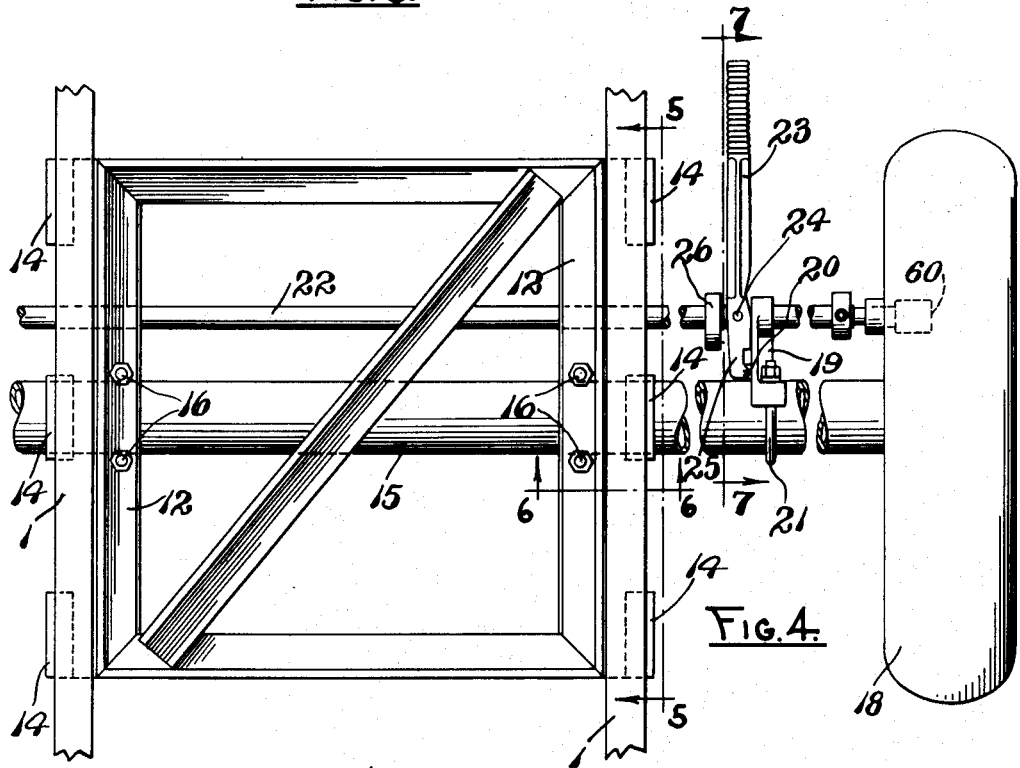
Figure 5:
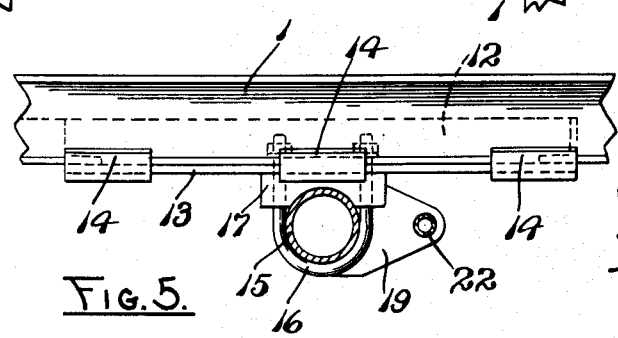

An understanding of the invention may be had from the following description, taken in connection with the accompanying drawings, in which, Fig. 1 shows the snow remover of my invention with the carrying wheels as they are located when the snow remover is being pushed by a rear movement of a truck, Fig. 2 is a similar view showing the snow removing mechanism as it is drawn over a road, and the positioning of the carrying wheels under such condition, Fig. 3 is a section and rear elevation thereof substantially on the plane of line 3—3 of Fig. 2, Fig. 4 is a fragmentary plan view of the adjustable mounting of the axle and wheels and the brake mechanism associated therewith on the trailer chassis frame members, Fig. 5 is a partial vertical section and side elevation substantially on the plane of line 5—5 of Fig. 4, Fig. 6 is an enlarged transverse vertical section of one of the chassis frame members substantially on the plane of line 6—6 of Fig. 4, Fig. 7 is a fragmentary enlarged vertical section substantially on the plane of line 7—7 of Fig. 4, and Fig. 8 is a plan of the structure shown in Fig. 7.

Like reference characters refer to like parts in the different figures of the drawings.

In the structure of the chassis frame which carries the snow elevator, two parallel side chassis members 1 of channel form, at their front ends have vertical frame members of posts 2 at right angles thereto, and a transverse cross-rail 3 of channel form strengthens and reinforces the frame. Between the upper and lower ends of the posts 2 shock absorbing bumpers 4 are mounted, against which the rear end of a truck body presses when, on backing the truck, the trailer is moved in the process of snow removal by a well known snow removal elevator mechanism, shown as a whole at 5, disclosed in an inclined position between the rear ends of the chassis members 1 and the upper ends of the posts 2, the upper end portion of the conveyor extending over the rear part of the body of the truck. At the back end of the trailer 1, wheels 6 are mounted as shown to ride upon the road when the mechanism is operated for snow removal.

A draw bar 7 is pivotally connected at its rear end to the front frame structure of the trailer. A chain 8 is connected at its lower end to the crossbar 3 (Fig. 2) and at its upper end to the front end portion of the bar 7. An eye 9 permanently secured at the front end of the bar 7 may be detachably connected with a hook 10 at the rear of the frame of a truck 11, which either pushes or pulls the snow removing mechanism. In Fig. 1 pushing is done by the end of the body of the truck 11 against the shock absorbing pads or bumpers 4 in the direction indicated by the arrow. In pulling, the eye 9 is hooked with the hook 10, whereupon the bar 7 is turned outwardly and the chain 8 is drawn taut, holding the front lower corner portions of the trailer above the road, the pulling being in the direction indicated by the arrow in Fig. 2.

A rectangular frame of angle iron, having sides 12 connected by like crossbars at their ends and diagonally braced (Fig. 4), has the sides 12 positioned closely within and parallel to the lower chassis frame members 1. A plate 13 (Fig. 6) is located underneath each of the bars 12 for the length thereof and extends outwardly under the lower flange of its adjacent chassis member 1. At the outer edge of the plates 13, each the full length of the bar 12 under which it is located, a number of angle members 14 positioned as shown in Fig. 6, have their downwardly extending flanges welded to the outer edges of the plates 13 and their upper flanges extending over the lower flange of the adjacent frame member 1.

A horizontal axle 15 is connected by U-bolts 16 to the sides 12 of the inner frame described, with suitable saddles 17 over the upper side of the shaft 15 and against the under sides of the plates 13. Such U-bolts permanently secure the frame sides 12 and the plates 13 together where the shaft is connected midway between the ends of the bars 12 and plates 13, and if necessary the plates 13 may be additionally secured to the bars 12. At the outer ends of the shaft 15, carrying wheels 18, with the usual pneumatic tires thereon, are mounted for rotation.

From this construction it is evident that the axle and wheel unit described, permanently connected with the interior rectangular or square frame, is adjustable along the chassis members 1 from a position at the front, as shown in Fig. 1, to a rear position as shown in Fig. 2.

A manually operable means for setting brakes on the wheels is provided, mounted upon the shaft 15. A supporting bracket 19, at one face thereof having a successive series of ratchet teeth 20 (Fig. 7), is connected by a U-bolt 21 between each wheel and the adjacent chassis frame member 1 (Fig. 4). A rod 22 paralleling the shaft 15 is mounted for rocking movement on and extends through the free ends of the brackets 19. It may be rocked by manual movement of a handle 23 which, between its ends is pivotally connected to the rod or tube 22 (Fig. 7) by a generally vertical pin 24, the handle 23 having a somewhat enlarged opening through which the rod or tube 22 passes. A finger 25 extends opposite to the handle 23, integral therewith, from the pin 24, reaching to and riding over the teeth 20 and shaped for engagement therewith. Such finger 25 is normally pressed against the teeth. A collar 26 fixed to the tube 22 and spaced a short distance from the handle, has a socket to receive a coiled compression spring 27, which under compression forces the finger 25 yieldingly into such engagement with the ratchet teeth 20.

The end of the rod 22 mounts a cam 60 (Figure 4). The brake structure on the wheels 18 may be of any conventional design, such as a drum having mounted therein a pair of brake shoes moved into and out of braking contact with the drum by rotation of the cam 60. The structure of the brake is neither illustrated nor described in detail since it is wholly conventional and is well known in the art. The specific details of the brake drum and of the brake shoes form no part of my invention.

With the wheel unit, as in Fig. 1, toward the front ends of the chassis frame, it may be releasably held in such position by a pin or pins 28 (Fig. 6) adapted to pass through vertical openings in conjunction with each other in the lower flange or flanges of the chassis members 1 and the plates 13 below them. With the brake released on backing up the truck, the snow loader will be moved against snow usually piled up in a windrow for removal, and the snow carried upwardly and over into the body of the truck. The center of gravity of the trailer and the conveyor mechanism carried by it is back of the axle 15 and wheels 6 ride upon the road or pavement. When the body of the truck is sufficiently loaded, it is only necessary to drive the truck in a forward direction and it will move away without affecting the snow removing apparatus which is left ready for the next truck to back into place.

At the finish of a job, and with the wheel unit located as in Fig. 1, a truck may be backed to proper position such that the draw bar 7 can be connected with the hook 10. The pin or pins 28 are removed and the brake is set by operation of the hand lever 23. Then upon forward movement of the truck, the wheels 18 remain stationary and the chassis frame with its elevating conveyor is moved forward. The pin or pins 28 are dropped again through an opening in the lower flange of either one or both of the chassis frame members 1, against which the rear ends of the plates 13 may come into engagement to stop further forward movement of the chassis with respect to the wheels and their axle. The center of gravity has been shifted to a position in front of the axle 15, whereupon the forward end of the trailer will drop downwardly and the rear end lift as in Fig. 2, with the wheels 6 above the road or pavement. The brake is then released so that the trailer may be drawn to another place or location. To condition the machine for snow removal when it has been drawn to a place of use thereof, the brakes are again set, and the truck which has been pulling the trailer is reversed in movement to go backward and push the trailer and its conveyor mechanism carried thereby rearwardly until the position of the wheels is that shown in Fig. 1, whereupon they may be held in such position by utilization of the pin or pins 20 as described. This lowers the rear end of the trailer to the road or pavement for the wheel 6 to carry its rear end.

The structure described is very practical and useful and has been so demonstrated in use.

The invention is defined in the appended claim and is to be considered comprehensive of all forms of structure coming within their scope.

I claim:

In a portable loading machine having a forward end and a rearward end and adapted to being towed at the forward end by a vehicle, the combination including: a pair of spaced chassis members under said loading machine; a rectangular frame between said chassis members; slide members connecting said rectangular frame to said chassis frame members for forward and rearward reciprocating sliding movement therealong; a horizontal axle; wheels rotatably mounted at the ends of the axle; means for connecting said axle to said rectangular frame, said means being located between the front and rear ends of said rectangular frame; a rear wheel at the rearward end of said loading machine; said rectangular frame and said axle being movable along said chassis frame from a position adjacent the forward end of said loading machine and forward of the center of gravity of said loading machine to a position rearward of the center of gravity of said loading machine whereby said loading machine will tip forwardly about said axle and raise said rear wheel; means at the forward end of said loading machine for attaching it to said vehicle; and brake means carried by said axle operable to hold said wheels on said axle against rotation whereby said loading machine upon being urged forwardly will slide with respect to said rectangular frame until said axle is rearwardly of the center of gravity of said vehicle; and said loading machine is supported by said wheels on said axle and said means attaching said loading machine to said vehicle, and upon being urged rearwardly said loading machine will slide with respect to said rectangular frame until said axle is adjacent said forward end of said loading machine and said loading machine is supported on said wheels on said axle and said rear wheel; said brake means comprising brackets secured to the axle inwardly of said wheels, a rock shaft extending through the outer ends of said brackets mounted for rocking movement; a manually operable handle member to rock the shaft, and means thereon and on a bracket to releasably hold the shaft in any position to which it is rocked, said rock shaft extending to the wheel at each end for setting or releasing brakes upon rocking the shaft in opposite directions.

LEO O. GREELEY.

References Cited in the file of this patent

UNITED STATES PATENTS

| Number | Name | Date |
|---|---|---|
| 1,244,024 | Brown | Oct. 23, 1917 |
| 1,469,484 | Ragsdale | Oct. 2, 1923 |
| 1,987,928 | Eckert | Jan. 15, 1935 |
| 1,989,940 | McGaughan et al. | Feb. 5, 1935 |
| 2,010,969 | Soulis | Aug. 13, 1935 |
| 2,196,338 | McDaniel | Apr. 9, 1940 |
| 2,332,326 | Lex | Oct. 19, 1943 |
| 2,387,093 | Sehmied | Oct. 16, 1945 |
| 2,389,759 | Blank et al. | Nov. 27, 1945 |

FOREIGN PATENTS

| Number | Country | Date |
|---|---|---|
| 15 | Great Britain | Jan. 1, 1910 |
| 840,738 | France | Jan. 23, 1939 |